United States Patent
Schnetzka et al.

(10) Patent No.: US 10,075,114 B2
(45) Date of Patent: Sep. 11, 2018

(54) SYSTEM AND METHOD FOR CONTROLLING DC LINK VOLTAGE OF A POWER CONVERTER

(71) Applicant: General Electric Company, Shenectady, NY (US)

(72) Inventors: Harold Robert Schnetzka, Simpsonville, SC (US); Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/059,343

(22) Filed: Mar. 3, 2016

(65) Prior Publication Data
US 2017/0257046 A1    Sep. 7, 2017

(51) Int. Cl.
*H02P 11/00* (2006.01)
*H02P 9/00* (2006.01)
(Continued)

(52) U.S. Cl.
CPC .............. *H02P 9/007* (2013.01); *F03D 9/003* (2013.01); *H02P 9/42* (2013.01)

(58) Field of Classification Search
CPC ............. H02P 9/007; H02P 9/42; F03D 9/003
See application file for complete search history.

(56) References Cited

U.S. PATENT DOCUMENTS 4,700,081 A * 10/1987 Kos ................. F03D 7/0272
                                                     290/44
5,289,041 A *  2/1994 Holley .............. F03D 7/0224
                                                     290/44
(Continued)

FOREIGN PATENT DOCUMENTS

EP    2 296 257 A2    3/2011
GB    2 331 858 A     6/1999
(Continued)

OTHER PUBLICATIONS

Stevanovic, et al., Industrial Readiness of SiC Power Devices, GE Global Research Center; CFES Annual Conference; Power Point Presentation, Feb. 26, 2015, 18 pages https://www.rpi.edu/dept/cfes/AnnualConference/b2%20Stevanoic%20GE.pdf.
(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

The present subject matter is directed to a system and method for operating an electrical power circuit connected to a power grid. The electrical power circuit has a power converter electrically coupled to a generator. The method includes monitoring a rotor speed of the generator during operation of the electrical power circuit. The method also includes increasing an operating range of the rotor speed of the generator. Further, the method includes determining at least one of a line-side voltage of a line-side converter of the power converter or a rotor-side voltage of a rotor-side converter of the power converter during operation of the electrical power circuit. Another step include controlling, via a converter controller, a DC link voltage of a DC link of the power converter as a function of one or more of the line-side voltage, the rotor-side voltage, and/or the rotor speed.

20 Claims, 6 Drawing Sheets

(51) Int. Cl.
*H02P 9/42* (2006.01)
*F03D 9/00* (2016.01)

(56) References Cited

U.S. PATENT DOCUMENTS

| | | | | |
|---|---|---|---|---|
| 7,038,330 | B2* | 5/2006 | Rosebrock | F03D 9/255 290/44 |
| 8,013,461 | B2* | 9/2011 | Delmerico | H02M 5/4585 290/44 |
| 8,039,982 | B2* | 10/2011 | Scholte-Wassink | H02K 3/28 290/44 |
| 8,570,003 | B2 | 10/2013 | Lu et al. | |
| 9,041,234 | B2 | 5/2015 | Lu et al. | |
| 9,083,220 | B2 | 7/2015 | Neumann et al. | |
| 2007/0024059 | A1* | 2/2007 | D'Atre | F03D 7/0272 290/44 |
| 2008/0001411 | A1 | 1/2008 | Ichinose et al. | |
| 2008/0150285 | A1* | 6/2008 | Corcelles Pereira | H02J 3/1807 290/44 |
| 2009/0206606 | A1* | 8/2009 | Jorgensen | F03D 7/0224 290/44 |
| 2010/0133831 | A1 | 6/2010 | Scholte-Wassink et al. | |
| 2010/0140939 | A1 | 6/2010 | Scholte-Wassink et al. | |
| 2011/0018270 | A1* | 1/2011 | Corcelles Pereira | H02J 3/1807 290/44 |
| 2011/0037262 | A1* | 2/2011 | Krueger | H02J 3/28 290/44 |
| 2011/0089693 | A1* | 4/2011 | Nasiri | F03D 7/0272 290/44 |
| 2011/0140421 | A1* | 6/2011 | Scholte-Wassink | H02K 3/28 290/44 |
| 2011/0140438 | A1* | 6/2011 | Delmerico | H02M 5/4585 290/55 |
| 2012/0205912 | A1* | 8/2012 | Wakasa | F03D 9/003 290/44 |
| 2012/0262129 | A1 | 10/2012 | Lu et al. | |
| 2013/0154263 | A1* | 6/2013 | Attia | H02P 9/007 290/44 |
| 2013/0181450 | A1 | 7/2013 | Narayana et al. | |
| 2013/0249501 | A1 | 9/2013 | Lu et al. | |
| 2014/0084587 | A1* | 3/2014 | Beekmann | F03D 7/0276 290/44 |
| 2014/0138949 | A1* | 5/2014 | El Moursi | H02P 29/032 290/44 |
| 2014/0265596 | A1 | 9/2014 | Yuan et al. | |
| 2015/0026964 | A1 | 1/2015 | Neumann et al. | |
| 2015/0026965 | A1 | 1/2015 | Neumann et al. | |
| 2015/0028703 | A1 | 1/2015 | Neumann et al. | |
| 2015/0059163 | A1 | 3/2015 | Neumann et al. | |
| 2015/0101180 | A1 | 4/2015 | Neumann et al. | |
| 2015/0145554 | A1 | 5/2015 | Moldenhauer et al. | |
| 2015/0162905 | A1 | 6/2015 | Wagoner et al. | |
| 2015/0229257 | A1 | 8/2015 | Lu et al. | |
| 2015/0275860 | A1* | 10/2015 | Carcangiu | F03D 17/00 290/44 |
| 2017/0272015 | A1* | 9/2017 | Klodowski | H02P 9/008 |
| 2018/0026563 | A1* | 1/2018 | Schnetzka | H02P 9/48 |

FOREIGN PATENT DOCUMENTS

| | | |
|---|---|---|
| WO | 93/11604 A1 | 6/1993 |
| WO | 2014/194464 A1 | 12/2014 |
| WO | WO2015043602 A1 | 4/2015 |

OTHER PUBLICATIONS

Asai, et al., Evaluation of SiC Power Diodes against Terrestrial Neutron-Induced Failure at Ground Level Failure at Ground Level Failure at Ground Level, JAXA Special Publication JAXA-SP-12-008E, pp. 162-165 https://repository.exst.jaxa.jp/dspace/bitstream/a-is/163232/1/61889035.pdf.

Dodge, Reduce Circuit Zapping from Cosmic Radiation, Power Electronics Technology Magazine, Sep. 2007, pp. 20, 22. http://powerelectronics.com/site-files/powerelectronics.com/files/archive/powerelectronics.com/mag/709PET21.pdf.

Dayaratne, Investigation of variable DC link voltage operation of a PMSG based wind turbine with fully rated converters at steady state, Power Electronics and Application (EPE 2011), Proceedings of the 2011-14$^{th}$ European Conference, Aug. 30, 2011-Sep. 1, 2011, pp. 1-10 http://ieeexplore.ieee.org/xpl/login.jsp?tp=&arnumber=60205337url=http%3A%2F%2Fieeexplore.ieee.org%2Fxpls%2Fabs_all.jsp%3Farnumber%D6020533.

"Application Considerations for Silicon Carbide MOSFETs," CREE, pp. 1-6 ( Sep. 2, 2015).

"CAS300M17BM2 1.7kV, 8.0 mΩ All-Silicon Carbide Half-Bridge Module," CREE, pp. 1-9 (2014).

"SCT30N120," STMicroelectronics NV, Revision 9, pp. 1-13 (Feb. 2015).

"SKM500MB120SC SiC Mosfet Module," SEMIKRON, Revision 0.1, pp. 1-3 (May 27, 2015).

"1700V SiC Power Module," GE Silicon Carbide half-bridge module offers superior performance for high power, high frequency applications, pp. 1-8 (May 8, 2015).

Extended European Search Report and Opinion issued in connection with corresponding EP Application No. 7157474.2 dated Jul. 4, 2017.

* cited by examiner

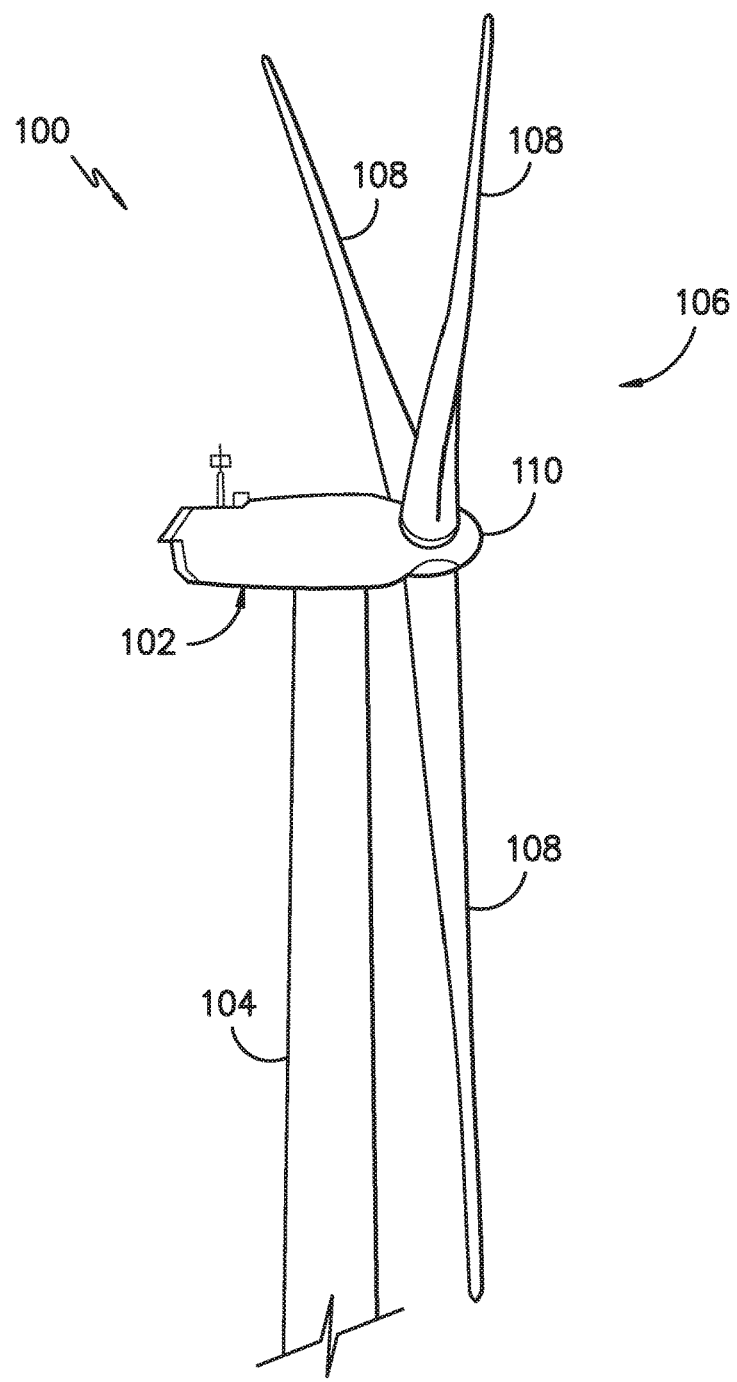
FIG. -1-

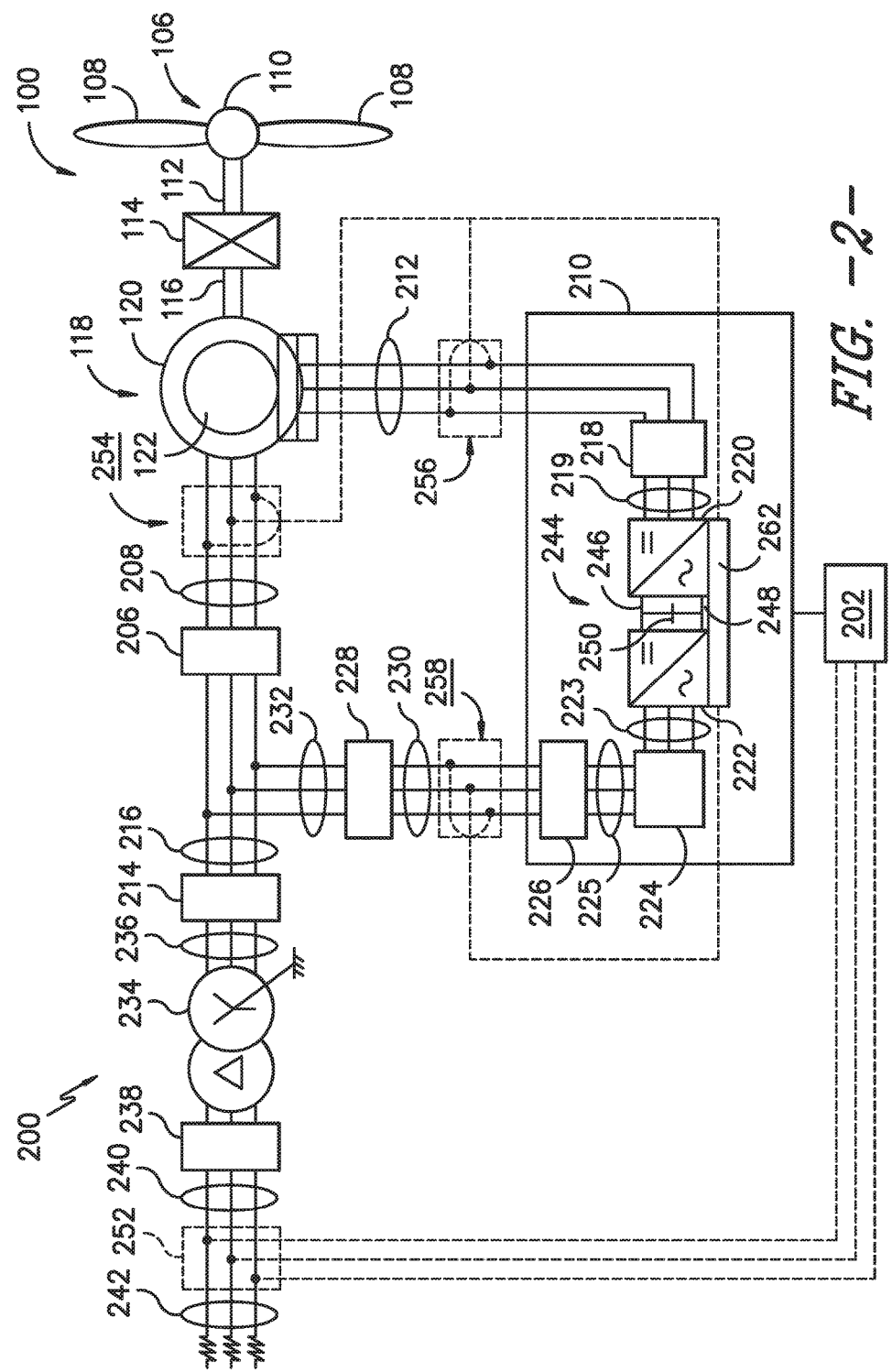
FIG. -2-

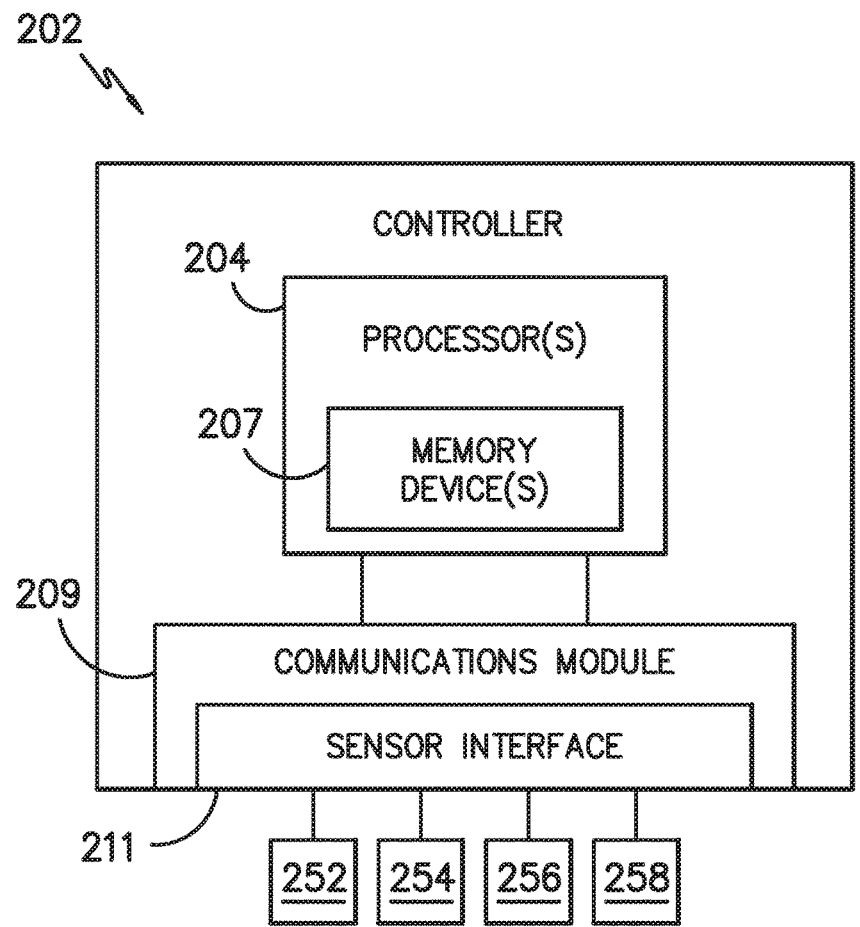
FIG. -3-

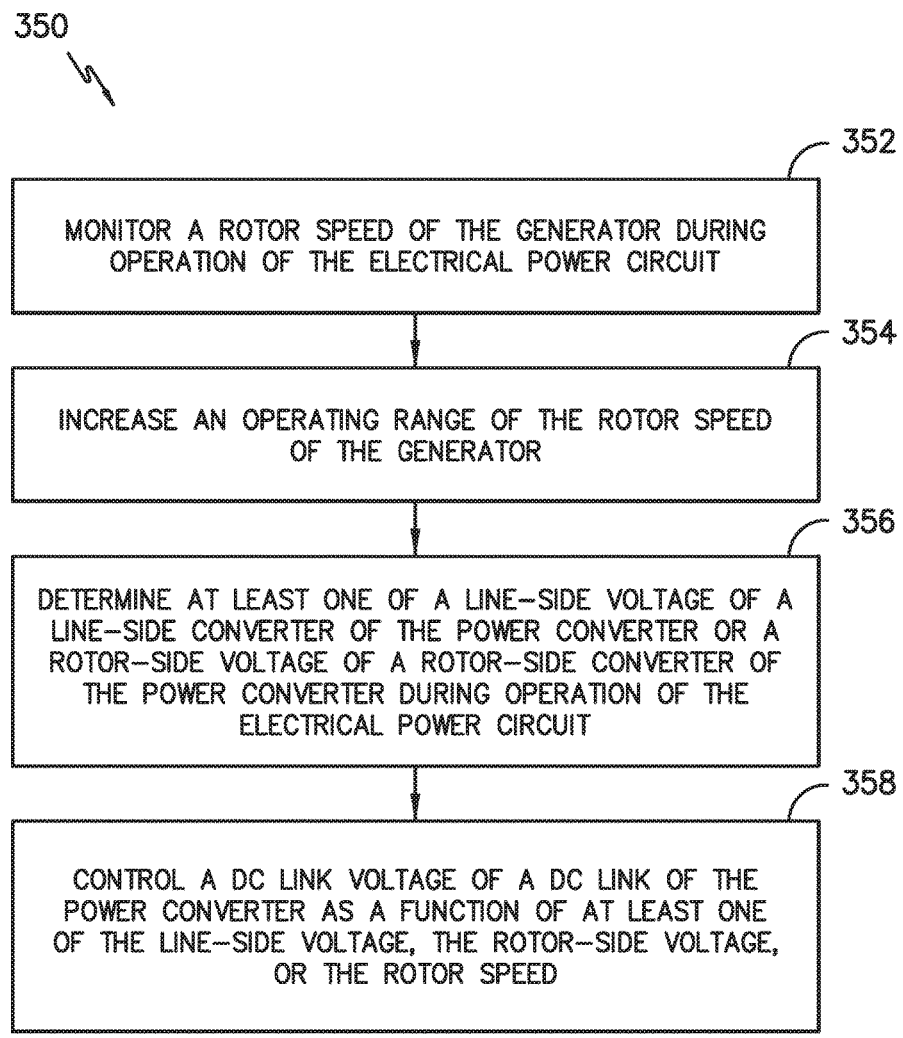
FIG. -4-

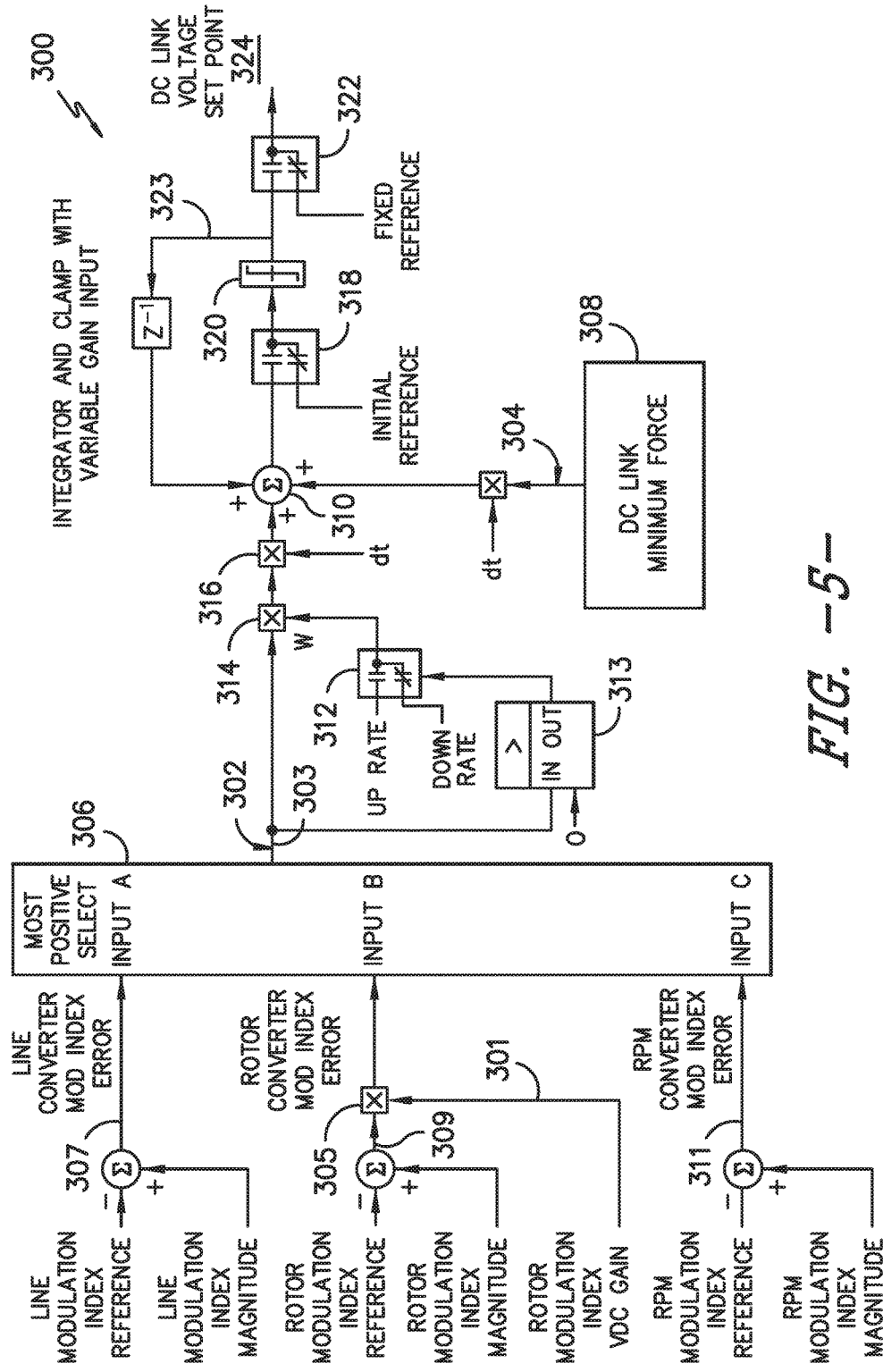
FIG. -5-

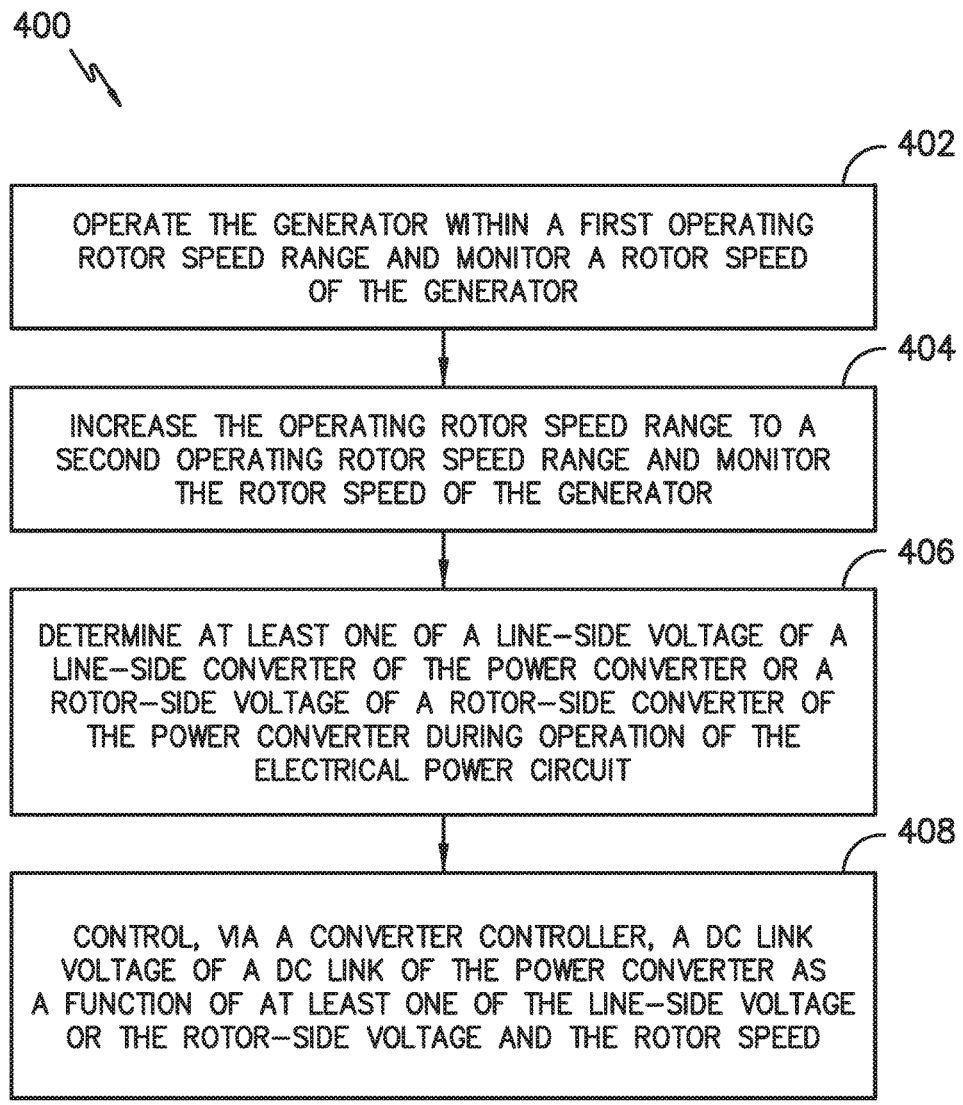
FIG. -6-

SYSTEM AND METHOD FOR CONTROLLING DC LINK VOLTAGE OF A POWER CONVERTER

FIELD OF THE INVENTION

The present disclosure relates generally to wind turbines and, more particularly, to a system and method for controlling DC link voltage of a power converter of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator rotor may be electrically coupled to a bi-directional power converter that includes a rotor-side converter joined to a line-side converter via a regulated DC link. More specifically, some wind turbines, such as wind-driven doubly-fed induction generator (DFIG) systems or full power conversion systems, may include a power converter with an AC-DC-AC topology. Standard power converters typically include a bridge circuit, a power filter, and an optional crowbar circuit. The bridge circuit typically includes a plurality of cells, for example, one or more power switching elements and/or one or more diodes.

The magnitude of the DC link voltage, i.e. the DC link voltage set point, is controlled by a boost control algorithm, which must by definition be kept at a level equal to the higher of the peak value of the rotor and mains voltage, plus some additional margin to allow for an ability to force current through the line and rotor impedance. Further, the maximum allowable DC link voltage is determined by the design of the rotor-side and line-side converters. More specifically, the DC link voltage can be governed by selection of the power switching device type and ratings, selection of the DC link capacitance type and ratings, parasitic elements (e.g. stray inductance), and the operation of the gate drivers that govern the switching of the power devices and consequently the transient overshoot voltage seen by the power switching devices.

The steady state DC link operating voltage set point impacts a number of items including but not limited to the maximum magnitude of fundamental AC voltage available at the rotor and line sides of the converter, the semiconductor losses, and the failure rate of the switching devices. In order to maximize the operating voltage of the DFIG, the steady state DC link operating voltage set point should be set as high as possible. Conversely, to obtain robustness in regards to grid voltage capability, a margin is required between the steady state DC link operating voltage set point and the maximum allowable instantaneous DC link voltage to avoid component failure, thereby requiring a lower steady state DC link voltage set point.

Accordingly, a converter DC link control methodology that allows for a converter design that can operate at a higher steady state DC link operating voltage set point, while minimizing losses, retaining robustness against grid events and minimizing negative effect on power switching device reliability would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating an electrical power circuit connected to a power grid. The electrical power circuit has a power converter electrically coupled to a generator. Thus, the method includes monitoring a rotor speed of the generator during operation of the electrical power circuit. The method also includes increasing an operating range of the rotor speed of the generator. Further, the method includes determining at least one of a line-side voltage of a line-side converter of the power converter or a rotor-side voltage of a rotor-side converter of the power converter during operation of the electrical power circuit. Another step may include controlling, via a converter controller, a DC link voltage of a DC link of the power converter as a function of at least one of the line-side voltage, the rotor-side voltage, or the rotor speed.

In one embodiment, the step of increasing the operating range of the rotor speed of the generator may include increasing the operating range of the rotor speed from a first operating range to a second operating range. More specifically, in certain embodiments, the second operating range may be larger than the first operating range by about 15% to about 20%. Further, for a 60-Hertz power converter, the first operating range may include a range from 800 rotations per minute (RPM) to about 1600 RPM (sync speed at 1200 RPM; −0.33 pu slip to +0.33 pu slip) and the second operating range may include a range from about 725 RPM to about 1675 RPM (sync speed at 1200 RPM; −0.396 pu slip to +0.396 pu slip). In addition, for a 50-Hertz power converter, the first operating range includes from about 1000 rotations per minute (RPM) to about 2000 RPM (sync speed at 1500 RPM; −0.33 pu slip to +0.33 pu slip), whereas the second operating range includes from about 908 RPM to about 2092 RPM (sync speed at 1500 RPM; −0.395 pu slip to +0.395 pu slip).

In another embodiment, the step of determining the rotor-side voltage of the rotor-side converter of the power converter may include calculating the rotor-side voltage as a function of, at least, the rotor speed. Further, in additional embodiments, the step of determining at least one of the line-side voltage of the line-side converter of the power converter or the rotor-side voltage of the rotor-side converter of the power converter may include monitoring at least one of the line-side voltage or the rotor-side voltage via one or more sensors.

In further embodiments, the sensor(s) may include electric current or voltage sensors configured to generate one or more feedback signals of the electrical power circuit. More specifically, in certain embodiments, the feedback signals may include at least one of grid feedback signals, line-side converter feedback signals, rotor-side converter feedback signals, or stator feedback signals. Alternately, the line-side and rotor-side converter current and voltage feedback signals may be generated within the power converter.

In additional embodiments, the method may include controlling, via the converter controller, the DC link voltage of the DC link of the power converter as a function of the line-side voltage, the rotor-side voltage, and the rotor speed. In another embodiment, the step of controlling, via the converter controller, the DC link voltage of the DC link of the power converter as a function of at least one of the line-side voltage or the rotor-side voltage and the rotor speed may further include increasing the DC link voltage of the power converter with increasing line-side voltage, rotor-side voltage, or rotor speed.

In still a further embodiment, the electrical power circuit may be part of a wind turbine power system.

In another aspect, the present disclosure is directed to a method for operating a wind turbine power system connected to a power grid. The wind turbine power system includes a power converter electrically coupled to a generator. Thus, the method includes operating the generator within a first operating rotor speed range and monitoring a rotor speed of the generator during such operation. Another step includes increasing the operating rotor speed range to a second operating rotor speed range and monitoring the rotor speed of the generator during such operation. The method also includes determining at least one of a line-side voltage of a line-side converter of the power converter or a rotor-side voltage of a rotor-side converter of the power converter during operation of the electrical power circuit. Still another step includes controlling, via a converter controller, a DC link voltage of a DC link of the power converter as a function of at least one of the line-side voltage, the rotor-side voltage, or the rotor speed.

In yet another aspect, the present disclosure is directed to an electrical power circuit. The electrical power circuit includes a generator having a rotor and a stator, a power converter, and a controller communicatively coupled to either or both of the power converter or the generator. The power converter includes a line-side converter electrically coupled to a power grid and a rotor-side converter electrically coupled to the generator. The controller is configured to perform one or more operations, including but not limited to monitoring a rotor speed of the generator during operation of the electrical power circuit, increasing an operating range of the rotor speed of the generator, determining at least one of a line-side voltage of the line-side converter or a rotor-side voltage of the rotor-side converter during operation of the electrical power circuit, and controlling a DC link voltage of a DC link of the power converter as a function of at least one of the line-side voltage, the rotor-side voltage, or the rotor speed. It should be understood that the electrical power circuit may be further configured with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a portion of one embodiment of a wind turbine according to the present disclosure;

FIG. 2 illustrates a schematic view of one embodiment of an electrical and control system suitable for use with the wind turbine shown in FIG. 1;

FIG. 3 illustrates a block diagram of one embodiment of a controller suitable for use with the wind turbine shown in FIG. 1;

FIG. 4 illustrates a flow diagram of another embodiment of a method for operating an electrical power circuit connected to a power grid according to the present disclosure;

FIG. 5 illustrates a schematic diagram of one embodiment of a system for controlling a DC link voltage reference according to the present disclosure; and FIG. 6 illustrates a flow diagram of another embodiment of a method for operating a wind turbine connected to a power grid according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for operating an electrical power circuit e.g. that is part of a wind turbine power system connected to a power grid. Further, the electrical power circuit has a power converter electrically coupled to a generator. Thus, the method includes monitoring a rotor speed of the generator during operation of the electrical power circuit and increasing an operating range of the rotor speed of the generator. Increasing the operating range provides a larger window to capture wind energy by extending either or both of the bottom end and/or the top end of the operating range. For example, the operating range may be extended on the bottom end for additional annual energy production (AEP) at low wind speeds. Further, the method includes determining a line-side voltage of a line-side converter of the power converter and/or a rotor-side voltage of a rotor-side converter of the power converter during operation of the electrical power circuit and controlling a DC link voltage of a DC link of the power converter as a function of one or more of the line-side voltage, the rotor-side voltage, and/or the rotor speed.

The present disclosure provides many advantages not present in the prior art. For example, increasing the operating range of the rotor speed of the generator can allow for an increased annualized energy production (AEP). Further, increasing the operating range of the rotor speed of the generator may also provide a reduction in the cost of electricity for renewable energy solutions as it can reduce the off-line/no production time periods and allow for more opportunities to quickly harness the wind energy when operating at very low rotor speed levels.

In addition, silicon carbide and/or gallium nitride based power semiconductor devices can provide higher operating voltage power switching capability as compared to silicon-based devices. As such, these switches enable higher operating DC link voltages in the power converter and a wider operating rotor speed range.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line current feedback signals, line-side converter feedback signals, rotor-side converter feedback signals, stator current feedback signals, line voltage feedback signals, or stator voltage feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Referring now to FIG. 4, a flow diagram of one embodiment of a method 350 for operating an electrical power system (e.g. the wind turbine power system of FIG. 2) is illustrated. As shown at 352, the method 350 includes monitoring a rotor speed of the generator 118 during operation thereof. More specifically, the rotor speed may also be monitored using the sensors 252, 254, 256, 258 as described herein. As shown at 354, the method 350 also includes increasing an operating range of the rotor speed of the generator 118. For example, in one embodiment, the step of increasing the operating range of the rotor speed of the generator 118 may include increasing the operating range of the rotor speed from a first operating range to a second operating range. More specifically, in certain embodiments, the second operating range may be larger than the first operating range by about 15% to about 20%. Thus, in particular embodiments, for a 60-Hertz power converter, the first operating range may include a range from 800 rotations per minute (RPM) to about 1600 RPM (sync speed at 1200 RPM; −0.33 pu slip to +0.33 pu slip) and the second operating range may include a range from about 725 RPM to about 1675 RPM (sync speed at 1200 RPM; −0.396 pu slip to +0.396 pu slip). In addition, for a 50-Hertz power converter, the first operating range includes from about 1000 rotations per minute (RPM) to about 2000 RPM (sync speed at 1500 RPM; −0.33 pu slip to +0.33 pu slip), whereas the second operating range includes from about 908 RPM to about 2092 RPM (sync speed at 1500 RPM; −0.395 pu slip to +0.395 pu slip).

As shown at 356, the method 350 may include determining at least one of a line-side voltage of a line-side converter 222 of the power converter 210 or a rotor-side voltage of a rotor-side converter 220 of the power converter 210 during operation thereof. For example, in certain embodiments, the rotor-side voltage of the rotor-side converter 220 may be calculated as a function of the stator voltage and frequency, a number of poles, rotor speed, machine impedance and turns ratio, and stator and rotor current. Alternatively, the line-side voltage of the line-side voltage and/or the rotor-side voltage may be determined via monitoring the voltages using the sensors 252, 254, 256, 258 described herein.

The maximum allowable instantaneous operating magnitude of the DC link 244 is determined by the design of the line-side and rotor-side converters 220, 222, including but not limited to selection of the power switching device types and ratings, selection of the DC link capacitance type and ratings, parasitic elements such as stray inductance and the operation of the gate drivers that govern the switching of the power devices and consequently the transient overshoot voltage seen by the power switching devices. Further, the steady state DC link operating voltage set point impacts a number of items including but not limited to the maximum magnitude of fundamental AC voltage available at the rotor and line side converters 220, 222, the semiconductor losses and the failure rate of the switching devices.

In order to maximize the operating voltage range of the generator 118, the steady state DC link operating voltage set point of the power converter 210 must be set as high as possible. Conversely, to obtain robustness in regards to grid voltage capability (e.g. high-voltage right through (HVRT) and islanding capability), a margin is required between the steady state DC link operating voltage set point and the maximum allowable instantaneous DC link voltage to avoid component failure, thereby necessitating a lower steady state DC link voltage set point. Minimizing the reliability effects of Single Event Burnout (SEB) and/or terrestrial cosmic radiation also calls for a minimization of the steady state DC link voltage set point.

Thus, as shown in FIG. 4 at 358, the method 350 includes controlling, e.g. via the converter controller 262, a DC link voltage of the DC link 244 of the power converter 210 as a function of one or more of the line-side voltage, the rotor-side voltage, and/or the rotor speed. More specifically, in certain embodiments, the method 350 may include controlling the DC link voltage of the DC link 244 of the power converter 210 as a function of the line-side voltage, the rotor-side voltage, and the rotor speed. In another embodiment, the step of controlling the DC link voltage of the DC link 244 as a function of one or more of the line-side voltage, the rotor-side voltage, and/or the rotor speed may further include increasing the DC link voltage of the DC link 244 with increasing line-side voltage, rotor-side voltage, or rotor speed.

In certain embodiments, it should be noted that operation of the DC Link voltage at the level required to meet the extreme ends of the extended operating rotor speed range is not required, nor is it desired. For example, when operating at speeds near the synchronous speed of the generator 118, the DC Link voltage set point can be reduced to a level dictated solely by peak value of the line-side voltage, plus some additional margin to allow for the forcing of current through the line-side or rotor-side inductors. By reducing the DC Link voltage set point when permitted by the operating RPM, the present disclosure reduces converter losses, provides an additional DC link voltage margin for HVRT events, and increases power switching device reliability.

Referring now to FIG. 5, a schematic diagram of one embodiment of a system 300 for controlling a DC link voltage reference according to the present disclosure is illustrated. As shown, the system 300 may include a dual control path for controlling the DC link voltage depending on the operating state of the wind turbine 100. For example, as shown, a first control path 302 of the system 300 is configured to control the DC link voltage during normal operating conditions, whereas a second control path 304 is configured to control the DC link voltage during non-normal operating conditions. Thus, the appropriate control path (i.e. path 302 or path 304) can be chosen at 310, i.e. when path 304 overwhelms path 302 in such a way as to drive the integrator 323 into the lower limit. In order to accomplish this, it is reasonable to have a DC link minimum force (e.g. from box 308) that is a large negative value so as to drive the integrator value to the lower clamp in a quick manner.

The operating path 302 is a closed loop control and operates in the linear region when the integrator limits 320 are not reached. In steady state operation, the DC link voltage settles to a value that will drive junction 303 to an average value of zero. In this way, the DC link 244 is kept to the lowest value within the integrator clamps that allow a desired margin of the most restrictive modulation index to be achieved. As such, the first control path 302 is configured to allow the DC link voltage to be adjusted within the limits of the integrator such that the DC link voltage is maintained at a level just high enough to operate the turbine. In addition, the first control path 302 allows operation to the maximum clamp when any of the three modulation indexes indicate that it is necessary to do so. This scheme helps to maximize annual energy production (AEP) during normal operating conditions and to prolong the lifetime of the DC link capacitors and/or IGBTs. The second control path 304 is configured to lower the DC link voltage, e.g. during low-voltage ride through (LVRT) events or any other conditions that require a lower DC link voltage, so as to protect the DC link 244 and its associated components, especially during recovery from an LVRT event.

More specifically, as shown, the first control path 302 includes a selector 306 configured to receive a line modulation index error, a rotor modulation index error, and a rotor speed (RPM) modulation index error and select a most-positive value. Further, as shown, each of the line modulation index error, the rotor modulation index error, and the rotor speed (RPM) modulation index can be determined by comparing a modulation index reference with a corresponding magnitude and determining the difference between such values. In addition, any of the three modulation index limits may be adjusted by a gain that allows proper calibration between those indices as shown at the output of each of the three summing junctions, i.e. 307, 309, 311. Each modulation index error may also be determined as a function of the output of each summing junction 307, 309, 311 and a gain, such as with the rotor modulation voltage (i.e. VDC) gain 301, e.g. via multiplier 305.

The output 303 (which is the most positive of the three inputs), is multiplied at 314 by W, which is a constant that determines the rate of change of the downstream integrator 323. More specifically, if the most positive of the three modulation index errors has a positive value, then the controller attempts to increase the value of the DC link voltage reference, and the UP RATE will be selected by elements 313 and 312. In contrast, if the most positive value of the three modulation index errors has a negative value, the DOWN RATE will be used, and the controller attempts to lower the value of the DC link voltage reference. Further, the UP RATE is typically faster so that the DC link voltage can be increased to accommodate the needs of a modulation index that is higher than the reference point in an expedient manner, thereby preventing mis-operation of the turbine. In addition, the dt multipliers at 316 and 304 are simply 'delta time' compensations for the integrator 323. Moreover, the voltage cannot rise above the upper clamp 320 of the integrator 323.

Such operation is a closed loop method which can operate in a linear manner unless the limits of the integrator clamps are reached. However, path 304 is provided for certain operational conditions, as mentioned before, like events wherein a lower DC link voltage is desired to help protect the converters from damage. The INITIAL REFERENCE 318 inside of the integrator 323 is used only when the converters are not running in order to allow for a consistent starting DC link voltage. The DC link voltage reference scheme may be configured as FIXED REFERENCE for test purposes, as shown at box 322, but this is not normally the case. The output signal from the converter as described above corresponds to the DC link voltage set point 324 that can be used to control the DC link via the controller 262.

As such, the present disclosure minimizes the DC link voltage set point by monitoring the line side converter voltage, the rotor side voltage and the operating rotor speed (RPM) of the generator 118. Such a system provides for a reduction in converter losses, a DC link margin against tripping/damage from grid events, and minimizing the effects of Single Event Burnout (SEB) and/or terrestrial cosmic radiation on the power switching devices.

Referring now to FIG. 6, a flow diagram of another embodiment of a method 400 for operating the wind turbine power system (e.g. the system of FIG. 2) is illustrated. Thus, as shown at 402, the method 400 includes operating the generator 118 within a first operating rotor speed range and monitoring a rotor speed of the generator 118. As shown at 404, the method 400 includes increasing the operating rotor speed range to a second operating rotor speed range and monitoring the rotor speed of the generator 118. As shown at 406, the method 400 includes determining at least one of a line-side voltage of a line-side converter 222 of the power converter 210 or a rotor-side voltage of a rotor-side converter 220 of the power converter 210 during operation of the electrical power circuit 200. As shown at 408, the method 400 includes controlling, via a converter controller 262, a DC link voltage of a DC link 244 of the power converter 210 as a function of at least one of the line-side voltage or the rotor-side voltage and the rotor speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an electrical power circuit connected to a power grid, the electrical power circuit having a power converter electrically coupled to a generator, the method comprising:
   operating the generator within a first rotor speed range;
   monitoring a rotor speed of the generator during the operation of the generator within the first rotor speed range;
   expanding the first rotor speed range to a second rotor speed range;
   operating the generator within the second rotor speed range;
   determining, during the operation of the generator within the second rotor speed range, at least one of a line-side voltage of a line-side converter of the power converter or a rotor-side voltage of a rotor-side converter of the power converter; and,
   increasing, during the operation of the generator within the second rotor speed range and via a converter controller, a DC link voltage of a DC link of the power converter as a function of at least one of the line-side voltage, the rotor-side voltage, or the rotor speed.

2. The method of claim 1, wherein the second rotor speed range is larger than the first operating range by about 10% to about 30%.

3. The method of claim 2, wherein the power converter comprises one of a 60-Hertz power converter and a 50-Hertz power converter and wherein, when the power converter comprises the 60-Hertz power converter, the first rotor speed range comprises from about 800 rotations per minute (RPM) to about 1600 RPM, and wherein the second rotor speed range comprises from about 725 RPM to about 1675 RPM, and wherein, when the power converter comprises the 50-Hertz power converter, the first rotor speed range comprises from about 1000 rotations per minute (RPM) to about 2000 RPM and the second rotor speed range comprises from about 908 RPM to about 2092 RPM.

4. The method of claim 1, wherein determining at least one of the line-side voltage of the line-side converter of the power converter or the rotor-side voltage of the rotor-side converter of the power converter comprises determining the rotor-side voltage of the rotor-side converter of the power converter and wherein
   determining the rotor-side voltage of the rotor-side converter of the power converter further comprises calculating, via the converter controller, the rotor-side voltage as a function of at least one of the rotor speed of the generator, a stator voltage, a stator frequency, a number of poles of the generator, a machine impedance of the generator, a machine turns ratio of the generator, a stator current, or a rotor current.

5. The method of claim 1, wherein determining at least one of the line-side voltage of the line-side converter of the power converter or the rotor-side voltage of the rotor-side converter of the power converter further comprises monitoring at least one of the line-side voltage or the rotor-side voltage via one or more sensors.

6. The method of claim 5, wherein the one or more sensors comprises electric current or voltage sensors configured to generate one or more electric current or voltage feedback signals of the electrical power circuit.

7. The method of claim 6, wherein the electric current or voltage feedback signals comprise at least one of grid feedback signals, line-side converter feedback signals, rotor-side converter feedback signals, or stator feedback signals.

8. The method of claim 1, further comprising increasing, via the converter controller, the DC link voltage of the DC link of the power converter as a function of the line-side voltage, the rotor-side voltage, and the rotor speed.

9. The method of claim 1, wherein increasing, via the converter controller, the DC link voltage of the DC link of the power converter as a function of at least one of the line-side voltage, the rotor-side voltage, or the rotor speed further comprises:
   increasing the DC link voltage of the power converter when at least one of the line-side voltage, the rotor-side voltage, or the rotor speed increases.

10. The method of claim 1, wherein the electrical power circuit is part of a wind turbine power system.

11. A method for operating a wind turbine power system connected to a power grid, the wind turbine power system having a power converter electrically coupled to a generator, the method comprising:
operating the generator within a first operating rotor speed range and monitoring a rotor speed of the generator;
expanding the first operating rotor speed range to a second operating rotor speed range and monitoring the rotor speed of the generator;
operating the generator within the second operating rotor speed range;
determining, during operation of the generator within the second operating rotor speed range, at least one of a line-side voltage of a line-side converter of the power converter or a rotor-side voltage of a rotor-side converter of the power converter; and,
increasing, during the operation of the generator within the second operating rotor speed range and via a converter controller, a DC link voltage of a DC link of the power converter as a function of at least one of the line-side voltage, the rotor-side voltage, or the rotor speed.

12. An electrical power circuit, comprising:
a generator having a rotor and a stator;
a power converter comprising a line-side converter electrically coupled to a power grid and a rotor-side converter electrically coupled to the generator; and,
a controller communicatively coupled to at least one of the power converter and the generator, the controller configured to perform one or more operations, the one or more operations comprising:
operating the generator within a first rotor speed range;
monitoring a rotor speed of the generator during the first rotor speed range;
expanding the first rotor speed to a second rotor speed range;
operating the generator within the second rotor speed range;
determining, during the operation of the generator within the second rotor speed range, at least one of a line-side voltage of the line-side converter or a rotor-side voltage of the rotor-side converter; and,
increasing, during the operation of the generator within the second rotor speed range, a DC link voltage of a DC link of the power converter as a function of at least one of the line-side voltage, the rotor-side voltage, or the rotor speed.

13. The electrical power circuit of claim 12, wherein the second rotor speed range is larger than the first rotor speed range by about 15% to about 20%.

14. The electrical power circuit of claim 12, wherein determining at least one of the line-side voltage of the line-side converter of the power converter or the rotor-side voltage of the rotor-side converter of the power converter comprises determining the rotor-side voltage of the rotor-side converter of the power converter and wherein
determining the rotor-side voltage of the rotor-side converter of the power converter further comprises calculating, via the converter controller, the rotor-side voltage as a function of at least one of the rotor speed of the generator, a stator voltage, a stator frequency, a number of poles of the generator, a machine impedance of the generator, a machine turns ratio of the generator, a stator current, or a rotor current.

15. The electrical power circuit of claim 12, wherein determining at least one of the line-side voltage of the line-side converter of the power converter or the rotor-side voltage of the rotor-side converter of the power converter further comprises monitoring at least one of the line-side voltage or the rotor-side voltage via one or more sensors.

16. The electrical power circuit of claim 15, wherein the one or more sensors comprises electric current sensors configured to generate one or more electric current feedback signals of the electrical power circuit.

17. The electrical power circuit of claim 16, wherein the one or more current feedback signals comprise at least one of grid feedback signals, line-side converter feedback signals, rotor-side converter feedback signals, or stator feedback signals.

18. The electrical power circuit of claim 12, further comprising increasing, via the controller, the DC link voltage of the DC link of the power converter as a function of the line-side voltage, the rotor-side voltage, and the rotor speed.

19. The electrical power circuit of claim 12, wherein increasing, via the controller, the DC link voltage of the DC link of the power converter as a function of at least one of the line-side voltage, the rotor-side voltage, or the rotor speed further comprises:
increasing the DC link voltage of the power converter when at least one of the line-side voltage, the rotor-side voltage, or the rotor speed increases.

20. The electrical power circuit of claim 12, wherein the electrical power circuit is part of a wind turbine power system.

* * * * *